XR 3,009,134
20224
x 2055W
CROSS REFERENCE SEARCH ROOM

Nov. 14, 1961 A. BROSH 3,009,134

BINARY SIGNAL VERIFICATION SYSTEM

Filed Sept. 5, 1957 2 Sheets-Sheet 1

INVENTOR.
AMNON BROSH
BY
Edward M. Farrell
ATTORNEY

3009134
OR IN 340/171R

Nov. 14, 1961 A. BROSH 3,009,134

BINARY SIGNAL VERIFICATION SYSTEM

Filed Sept. 5, 1957 2 Sheets-Sheet 2

INVENTOR.
AMNON BROSH

BY Edward M. Farrell

ATTORNEY

United States Patent Office 3,009,134

Patented Nov. 14, 1961

3,009,134

BINARY SIGNAL VERIFICATION SYSTEM

Amnon Brosh, Philadelphia, Pa., assignor, by mesne assignments, to American Bosch Arma Corporation, Hempstead, N.Y., a corporation of New York Filed Sept. 5, 1957, Ser. No. 682,152
3 Claims. (Cl. 340—171)

This invention relates to verification systems, and more particularly to means for verifying the operating conditions of various functions at a remote station.

In many types of control and supervision systems, various functions at remote stations are controlled by signals transmitted from a master or central control station. In many such systems provided heretofore, no way for verifying whether or not the remote station received the transmitted signal or effected the desired changes were included.

An example of a system wherein verification would be highly useful is described in a patent of L. P. Clark, entitled "Highway Control Indicating System," Patent No. 2,849,701, issued August 26, 1958, and assigned to the same assignee as the present invention. Means for electrically controlling the indications on a variable highway sign, such as shown in the aforementioned application, is described in another co-pending patent application of A. Brosh et al., entitled "Control System," Serial No. 652,912, filed April 15, 1957, and also assigned to the same assignee as the present invention.

In the aforementioned patent and patent application, variable highway indicating signs are illustrated. These signs are designed for directing motorists or for informing motorists of various types of road conditions which lie ahead. For example, the sign may indicate "ice," "snow" or other hazardous road conditions. The sign may also indicate a "danger" warning together with a recommended speed limit. As the road conditions change, the indications on the signs are adapted to be changed either automatically in response to signals from a plurality of transducers associated with the road for reflecting road conditions or by remote control by means of a radio coded signal transmitted from a touring police car or a central control station. As the complexity of our highway systems increases, it becomes increasingly important to know whether or not highway signs are operating properly and displaying correct indications.

It is an object of this invention to provide an improved verification system.

It is a further object of this invention to provide an improved verification system which will verify indications at a remote highway sign and transmit information relating to the indications to a central control station.

In accordance with the present invention, a verification system comprises at least one remote station and a central station. An electrical circuit at the remote station is adapted to convert one or more functions at the remote station into corresponding electrical signals. The electrical signals are transmitted to a master or central control station. Means are included in the central control station for converting the received electrical signals into indications so that the operating conditions at the remote station may be verified at the central control station.

Other objects and advantages of the present invention will be apparent and suggest themselves to those skilled in the art, from a reading of the following specification and claims in conjunction with the accompanying drawings, in which:

Figure 1:
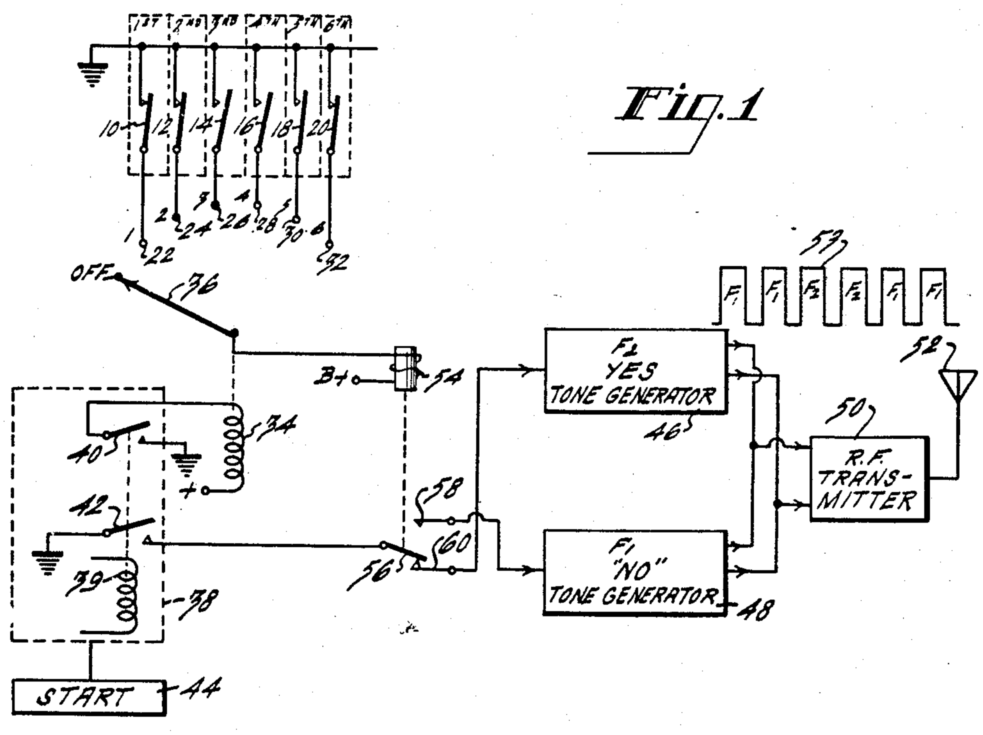
FIGURE 1 is a schematic, partly in block diagram form, of a remote receiving station, in accordance with the present invention.
Figure 2:
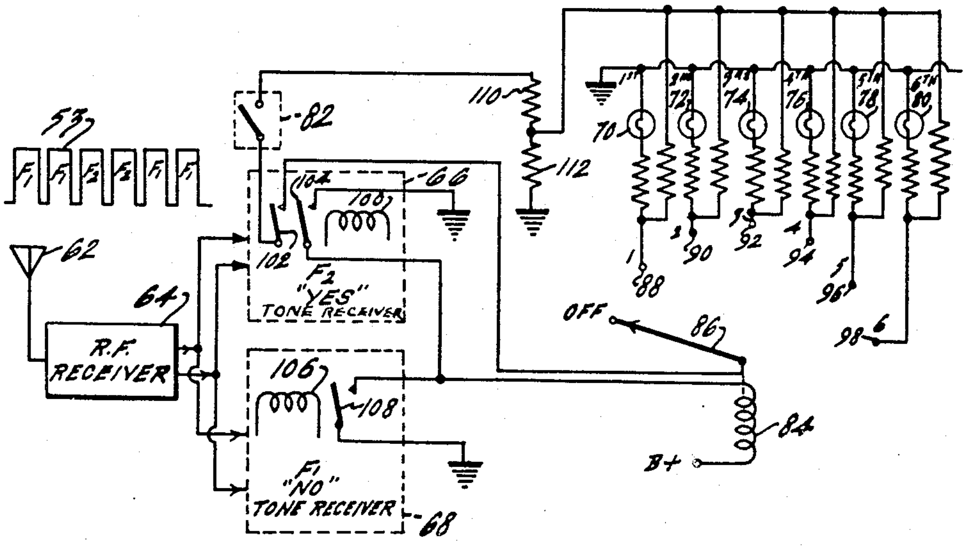
FIGURE 2 is a schematic diagram, partly in block diagram form, of a central control station, in accordance with the present invention.

Referring particularly to FIGURE 1, a plurality of switches 10, 12, 14, 16, 18, and 20 are associated with a plurality of electrical contacts 22, 24, 26, 28, 30, and 32, respectively. The switches 10 to 20 are returned to ground when any of their associated contact arms are closed. A stepping coil 34 is adapted to step the stepper arm 36 from its associated "off" contact to scan the electrical contacts 22 to 32 during the verification period.

A relay pulsing circuit 38 is adapted to operate the stepper coil 34 in steps. The relay pulsing circuit 38 may become operative immediately following the changing of a particular function or indication at a remote control station or at predetermined timed intervals. It may also be made operative by a control signal transmitted from a central station when verification information is desired. The starting of the operation of the relay pulsing circuit 38 may be controlled by a circuit included in a block 44. This circuit may include a pushbutton or relay adapted to start the operation of circuit 38 which comprises a single pulse generator employed to operate coil 39 in pulses and contacts 40 and 42. The type of circuit or device for controlling the operation of the relay pulsing circuit 38 is not shown or described in detail since it may comprise various types of means well known to those skilled in the art.

One of a pair of tone generators 46 and 48 is adapted to be operated for each pulse produced during the verification period, the particular tone generator made operative being dependent upon the condition of the switches 10 to 20 as the stepper arm 36 scans contacts 22 to 32, as will be seen. The generated tones from the tone generators are applied to the radio frequency transmitter 50 to modulate a carrier signal which is transmitted to a central control station through an antenna 52. The sequence of the pulses included in the transmitted signal include a series of tones generated by the tone generators 46 and 48, such as illustrated by the waveform 53.

The particular tones generated are dependent upon the operating condition of a relay 54 and the position of its associated contact arm 56. Operation of the relay 54 and the position of the contact arm 56 are dependent upon the position of the switches 10 to 20 as the stepping arm 36 scans the contacts 22 to 32. When any of the contacts 22 to 32 are returned to ground due to the closed position of the switches 10 to 20, the relay 54 becomes operative and its associated contact 56 is in the up position to engage the contact 58. Since the contact arm 42 is also returned to ground during the pulsing interval, the ground return connection is utilized to cause the tone generator 48 to become operative to generate a tone of a predetermined signal, which may be of a frequency designated as $F_1$ and considered as a "no" signal.

As the stepper arm 36 scans contacts 22 to 32, and the switches 10 to 20 associated with the contacts are open, the relay 54 will remain inoperative since no ground relay is provided through the switches to permit operation thereof. Under these conditions, the contact arm 56 is in the down position to engage a contact 60. Since the contact arm 42 is closed during the pulsing interval, the tone generator 46 is adapted to become operative to generate a predetermined tone signal, which may be of a frequency designated as $F_2$ and considered as a "yes" signal.

It is thus seen that the carrier signal transmitted from the transmitter 50 will be modulated by a series of pulses, the frequency component of which is dependent upon the positions of the switches 10 to 20 during the verification interval. Information relating to the positions of the switches 10 to 20 is now adapted to be transmitted to a central control station.

The carrier signal transmitted from the remote station is received at the central control station by an antenna 62 and is applied to a radio frequency receiver 64. The tone signals received may be extracted from the carrier signal by means of filter networks or by means of other well known demodulator circuits. The original tones $F_2$ and $F_1$ generated by the tone generators 46 and 48 (FIG. 1) are applied to a pair of tone receivers 66 and 68, respectively. The tone signals are used to operate a plurality of indicating lamps, which may comprise neon bulbs or glow lamps 70, 72, 74, 76, 78 and 80, as will be described. A switch 82 is adapted to be closed during the verification period. The switch 82 may be closed manually by an operator at the central control station or be made closed by a relay responsive to a signal from the remote station. A stepping coil 84 is adapted to be operated in pulses in accordance with the number of tone pulses received by the central control station. Operation of the stepping coil 84 causes a stepper arm 86 to move from its "off" contact position to scan contacts 88, 90, 92, 94, 96 and 98 during the verification period. When a "yes" signal is received, i.e. a tone comprising the frequency $F_2$, a relay 100 is made operative to close its pair of associated contact arms 102 and 104. When a "no" signal is received, i.e. a tone comprising the frequency $F_1$, a relay 106 is made operative to close its associated contact arm 108. Closing of either of the contact arms 104 or 108 causes the stepping coil 84 to step the stepping arm 86 causing the arm to scan the contacts 88 to 98. Since the pulses received by the central control station occur at substantially the same time that the pulses are generated at the remote station, it may be seen that the stepper arm 86 moves in synchronization with the stepper arm 36 (FIG. 1).

A source of B+ potential is connected to the indicating lamps 70 to 80, which may be of the glow lamp type, when the contact arm 102 is closed. Under these conditions the B+ potential is applied through the contact arm 102, the stepper arm 86, one of the contacts 88 to 98, dependent upon the relative position of the stepper arm 86, a resistor associated with each of the indicating lamps, to the indicating lamps 70 to 80 to ground. The contact arm 102 will be closed when a "yes" signal is received and open when a "no" signal is received. The indicator lamps 70 to 80 will light only when a "yes" signal is received, since B+ is applied thereto only when the contact arm 102 is closed. When the contact arm 102 is open, as during the reception of a "no" signal, the indicator lamps 70 to 80 remain inoperative since B+ is not applied thereto through the contact arm 102.

In some systems, it is desirable to have the indicator lamps 70 to 80 remain operative for a period of time after the actual reception of the verification signals. To accomplish this result, the source of B+ potential is also applied through the closed switch 82 across a voltage dividing network including resistors 110 and 112. A portion of the voltage from the resistor network is applied to the indicating lamps through associated resistors. The voltage applied from a point intermediate the resistors 110 and 112 is lower than the source of B+ potential due to the voltage drop across the resistor 110. The value of the resistors 110 and 112 are chosen so that the voltage applied is sufficient to permit the indicating lamps 70 to 80 to remain lit after they have been made operative. At the same time, the voltage supplied to the lamps is not enough to cause any of the lamps to become operative. This condition is characteristic of many types of glow lamps. Thus, it is seen that the indicating devices 70 to 80 will become operative only when contact arm 102 is closed and a full B+ potential is applied thereto. After the devices become operative, the voltage from the resistors 110 and 112 is sufficient to maintain the indicating devices operative. The indicating devices will remain operative until the switch 82 is opened either manually or automatically.

The switches 10 to 20 (FIG. 1) may be said to correspond to the indicating devices 70 to 80. When one or more of the switches 10 to 20 is open, a "yes" signal is transmitted to cause actuation of one or more of the associated indicating devices. It is thus seen that an operator located at the central control station may determine which of the switches 10 to 20 are in a closed position and which of the switches are in an open position by determining which of the indicating devices 70 to 80 become operative during the verification interval.

Figure 3:
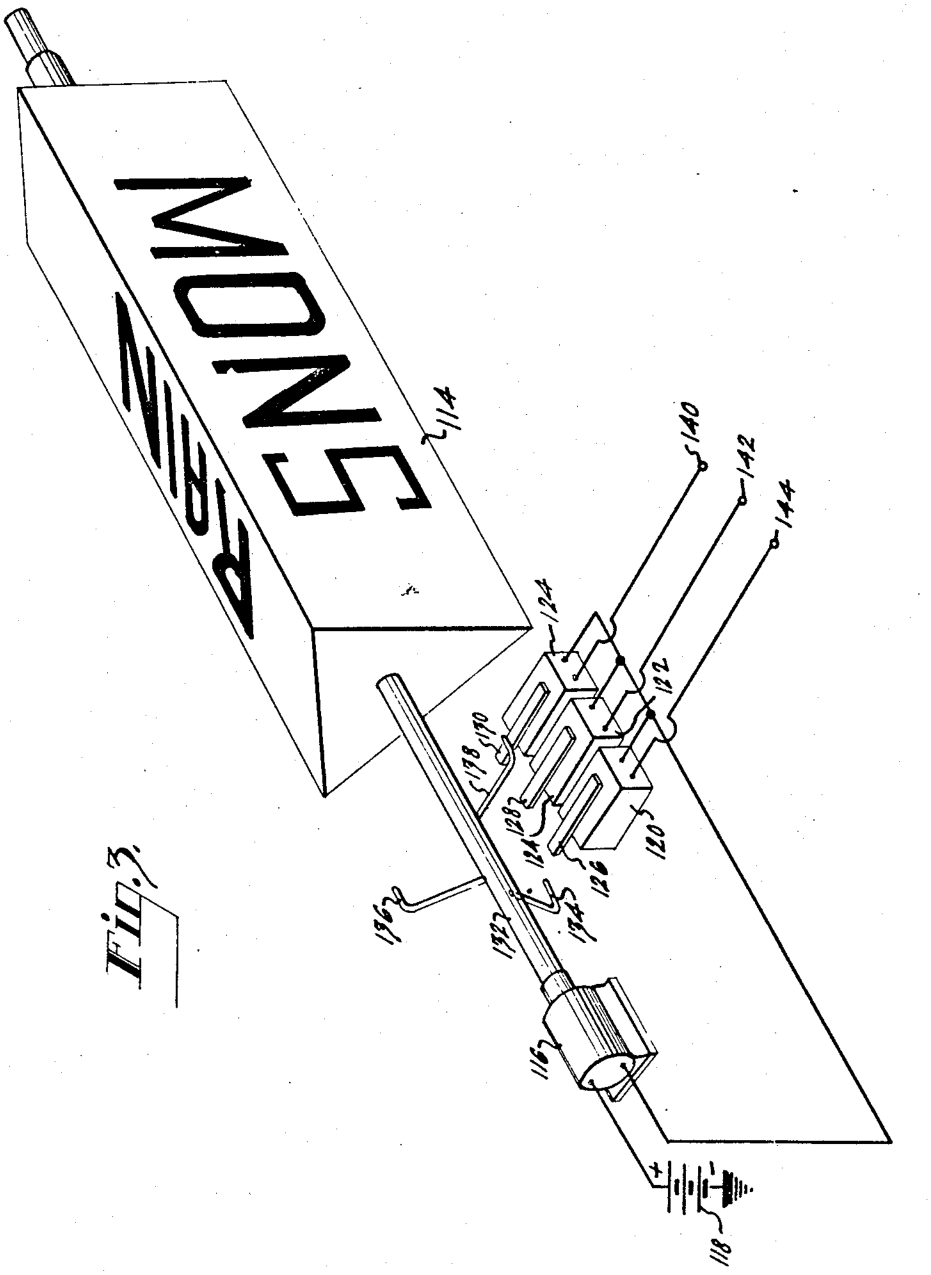
FIGURE 3 is an illustration of a portion of a variable highway display sign which may be included in the present invention.

Referring particularly to FIGURE 3, there is illustrated a portion of a variable highway indicating sign which may be included in the present invention. A triagular or three-section sign 114 is adapted to be rotated when a motor 116 is energized by a source of potential, such as a battery 118. Three microswitches or limit switches 120, 122 and 124 are normally closed and are adapted to be opened when their respective springs 126, 128 and 130 are urged in a downward direction. A shaft member 132, which rotates during the operation of the motor 116, includes three actuating arms 134, 136, and 138 positioned to physically engage springs 126, 128 and 130, respectively, during rotation of the shaft 132. The motor 116 operates when one of the three terminals 140, 142 and 144 is returned to ground and respective microswitches to which one of the terminals is connected is closed. The particular terminal 140, 142 or 144 which is returned to ground may depend upon the type of coded signal received by the remote station, as is described in the aforementioned co-pending patent application of A. Brosh et al.

The condition of the microswitches 120, 122 and 124 will reflect the indications or information displayed by the triangular sign 114. These microswitches may be the switches 10, 12 and 14 shown in FIGURE 1, for example. Thus, if the microswitch 130 is open, the switch 14 (FIG. 1) is open, which indicates that a "snow" indication is being displayed by the sign 144.

In the highway system signs provided commercially, a plurality of triangular signs have been employed with each sign including three microswitches. It is seen that the scanning of the microswitches in the manner described provides means for producing tone signals which may be transmitted to a central control station for verification purposes. For example, the open microswitch 14 indicating a "snow" indication will cause the indicating lamp 74 to become lit.

While a variable highway sign has been mentioned throughout this specification, it is apparent that the verification system described may be embodied in numerous types of control or supervision systems wherein it is desired to verify the operational conditions of various functions at a remote station.

Indications of the conditions at the remote station may be achieved by different types of devices than the neon bulb circuitry shown. For example, sound or other means may be employed to convey the verification information to an operator at the central control station. Also, the verification information received may be recorded for use at a later date.

While a two frequency tone system is described, it is recognized that the system may include systems involving pulses of the same frequency but characteristically different in some other respect. Also, in some cases, it may be desirable to transmit only a signal of "yes" frequency, slightly modifying the circuitry shown to provide synchronization between various operations of the remote and central control station. It is also apparent that wire line transmission may be employed in place of a radio link.

What is claimed is:

1. A verification system comprising a remote receiving station for transmitting verification signals, a central control station for receiving said verification signals, a plurality of switches at said remote station, said switches being responsive to open or close to ground in accordance with the operating conditions at said remote station, a pair of tone generators for generating pulse tone signals of two different frequencies when said generators are grounded, a relay adapted to be operative when returned to ground, a contact arm associated with said relay adapted to be connected to the first of said tone generators when said relay is operative and adapted to be connected to the second of said tone generators when said relay is inoperative, means for grounding said contact during the verification period, means including a stepping switch for stepping a plurality of contacts for scanning said switches to connect said switches to said relay to operate one or the other of said tone generators for each stepped contact to produce a series of pulse tone signals, means for transmitting the series of pulse tone signals generated by said tone generators to said central control station, a plurality of indicating devices at said central control station, means including a second stepping switch responsive to said series of pulse tone signals to sequentially scan said indicating devices in synchronization with the scanning of said switches at said remote station, means for operating said indicating devices when a tone from said first tone generator is received, and means for maintaining said indicating devices inoperative when a tone from said second tone generator is received.

2. In a verification system including a remote receiving station for transmitting verification signals and a central control station for receiving said verification signals, the combination comprising a plurality of switches at said remote station, said switches being disposed to open or close to ground dependent upon operating conditions at said remote station, a pair of tone generators for generating pulse tone signals of two different frequencies when said generators are grounded, a relay adapted to be operative when returned to ground, a contact arm associated with said relay adapted to be connected to the first of said tone generators when said relay is operative and adapted to be connected to the second of said tone generators when said relay is inoperative, said contact being connected to ground during the verification period, means including a stepping switch for stepping a plurality of contacts for scanning said switches to connect said switches to said relay at each stepped contact and return said relay to ground when the switches scanned are grounded thereby causing the first of said tone generators to become operative and maintaining said relay inoperative when the switches scanned are open thereby causing the second of said tone generators to become operative whereby a series of pulse tone signals is generated, means for transmitting the series of pulse tone signals generated by said tone generators to said central control station, a plurality of indicating devices at said central control station, means including a stepping switch responsive to each pulse in said series of pulse tone signals to sequentially scan said indicating devices in synchronization with the scanning of said switches at said remote station, means for operating said indicating devices when a pulse tone signal from said first tone generator is received, and means for maintaining said indicating devices inoperative when a tone from said second tone generator is received whereby the operating conditions of said indicating devices reflects the conditions of said switches at said remote station.

3. A verification system comprising a remote receiving station for transmitting verification signals, a central control station for receiving said verification signals, a plurality of switches at said remote station, said switches being disposed to open or close to ground in accordance with operating conditions at said remote station to provide corresponding electrical signals, a pair of tone generators for generating pulse tone signals of two different frequencies when said generators are grounded, a relay including a contact arm adapted to be connected to the first of said tone generators when said relay is operative and adapted to be connected to the second of said tone generators when said relay is inoperative, said contact being connected to ground during the verification period, means including a stepping switch for stepping a plurality of contacts for scanning said switches to connect said switches to said relay at each stepped contact whereby said relay is returned to ground when the switches scanned are grounded thereby causing the first of said tone generators to become operative and whereby said relay remains inoperative when the switches scanned are open thereby causing the second of said tone generators to become operative whereby a series of pulse tone signals is generated, means for transmitting the signals generated by said tone generators to said central control station, a plurality of glow lamps at said central control station, means including a second stepping switch responsive to said pulse tone signals to sequentially scan said glow lamps in synchronization with the scanning of said switches at said remote station, means for operating said glow lamps when a pulse tone signal from said first tone generator is received, means for maintaining said glow lamps inoperative when a pulse tone signal from said second tone generator is received whereby the operating conditions of said indicating devices reflects the conditions of said switches at said remote station, and means for maintaining the operated glow lamps in operative condition after the verification period.

References Cited in the file of this patent

UNITED STATES PATENTS

| | | |
|---|---|---|
| 1,945,666 | Stewart | Feb. 6, 1934 |
| 2,467,400 | Murray | Apr. 19, 1949 |
| 2,483,786 | Shenk | Oct. 4, 1949 |
| 2,523,300 | Herbst et al. | Sept. 26, 1950 |
| 2,559,390 | Blaisdell | July 3, 1951 |
| 2,643,172 | Reiss | June 23, 1953 |
| 2,666,913 | Schaelchlin et al. | July 19, 1954 |
| 2,710,390 | Forse | June 7, 1955 |
| 2,764,754 | Garfield | Sept. 25, 1956 |
| 2,816,163 | Robin | Dec. 10, 1957 |
| 2,833,857 | Robin | May 6, 1958 |

OTHER REFERENCES

"The Design of Switching Circuits," by Keister et al., Van Nostrand Co., 1951, p. 50 relied on.

Electronics, April 1954, by Schultheis, Jr., pp. 172–176.